(12) United States Patent
Ward

(10) Patent No.: US 9,054,555 B1
(45) Date of Patent: Jun. 9, 2015

(54) METHODS AND SYSTEMS FOR CHARGING A RECHARGEABLE BATTERY DEVICE ON A MARINE VESSEL

(75) Inventor: Aaron J. Ward, Oshkosh, WI (US)

(73) Assignee: Brunswick Corporation, Lake Forest, IL (US)

( * ) Notice: Subject to any disclaimer, the term of this patent is extended or adjusted under 35 U.S.C. 154(b) by 628 days.

(21) Appl. No.: 13/053,842

(22) Filed: Mar. 22, 2011

(51) Int. Cl.
*H02J 7/04* (2006.01)
*H02J 7/14* (2006.01)

(52) U.S. Cl.
CPC .......................................... *H02J 7/14* (2013.01)

(58) Field of Classification Search
USPC .................. 320/152, 157, 162; 114/337, 338; 440/3, 6, 75
See application file for complete search history.

(56) References Cited

U.S. PATENT DOCUMENTS

| | | |
|---|---|---|
| 1,332,631 A | 3/1920 | Morse |
| 1,633,454 A | 6/1927 | Mills |
| 3,230,698 A | 1/1966 | Nettles |
| 3,503,464 A | 3/1970 | Yardney |
| 3,566,717 A | 3/1971 | Berman et al. |
| 3,650,345 A | 3/1972 | Yardney |
| 3,703,642 A | 11/1972 | Balaguer |
| 3,888,325 A | 6/1975 | Reinbeck |
| 4,233,858 A | 11/1980 | Rowlett |
| 4,338,525 A | 7/1982 | Kilgore |
| 5,080,064 A | 1/1992 | Buslepp et al. |
| 5,081,365 A | 1/1992 | Field et al. |
| 5,301,764 A | 4/1994 | Gardner |
| 5,616,056 A | 4/1997 | Meissner |
| 5,835,876 A | 11/1998 | Hathaway et al. |
| 5,848,582 A | 12/1998 | Ehlers et al. |
| 5,880,575 A | 3/1999 | Itou et al. |
| 5,969,624 A | 10/1999 | Sakai et al. |
| 6,009,371 A | 12/1999 | Kobayashi |

(Continued)

FOREIGN PATENT DOCUMENTS

| | | |
|---|---|---|
| DE | 101 53 586 A1 | 5/2002 |
| DE | 103 18 293 A1 | 11/2004 |

OTHER PUBLICATIONS

Web Page for PowerCharge Battery Charger HV Series—Overview; http://www.powerdesignersusa.com/powercharge_hv.htm, last visited Jan. 27, 2011 (one page).

(Continued)

*Primary Examiner* — Yalkew Fantu
(74) *Attorney, Agent, or Firm* — Andrus Intellectual Property Law, LLP

(57) ABSTRACT

Systems and methods for charging a rechargeable battery device on a marine vessel utilize a rechargeable battery device, a charger charging the battery device, and a control circuit. The control circuit calculates an amount of current that is available to charge the battery device based upon an amount of current that is available from the shore power source and an amount of current that is being drawn from the shore power source by devices other than a voltage charger and limits the amount of current being drawn by the voltage charger to charge the battery device to an amount that is equal to or less than the calculated amount of current that is available to charge the battery device. The control circuit can repeatedly calculate the amount of current that is available to charge the battery device and limit the amount of current being drawn by a voltage charger to charge the battery device to thereby actively adjust an amount of charge applied to the battery device.

17 Claims, 4 Drawing Sheets

(56) References Cited

U.S. PATENT DOCUMENTS

| | | | |
|---|---|---|---|
| 6,133,707 | A | 10/2000 | Kikuchi et al. |
| 6,396,161 | B1 | 5/2002 | Crecelius et al. |
| 6,443,286 | B1 | 9/2002 | Bratel et al. |
| 6,517,464 | B2 | 2/2003 | Yamazaki et al. |
| 6,554,088 | B2 | 4/2003 | Severinsky et al. |
| 6,587,765 | B1 | 7/2003 | Graham et al. |
| 6,662,742 | B2 * | 12/2003 | Shelton et al. ............... 114/312 |
| 6,701,890 | B1 | 3/2004 | Suhre et al. |
| 6,757,606 | B1 | 6/2004 | Gonring |
| 6,758,198 | B1 | 7/2004 | Suhre et al. |
| 6,800,004 | B1 | 10/2004 | White et al. |
| 6,821,171 | B1 | 11/2004 | Wynveen et al. |
| 6,857,918 | B1 * | 2/2005 | Lebreux et al. ............... 440/6 |
| 6,882,129 | B2 * | 4/2005 | Boskovitch et al. .......... 320/119 |
| 6,915,781 | B2 | 7/2005 | Rayl |
| 6,919,711 | B2 | 7/2005 | Haydock et al. |
| 6,978,617 | B2 | 12/2005 | Goldmeer et al. |
| 6,982,632 | B2 | 1/2006 | Nagasaka et al. |
| 7,147,523 | B2 | 12/2006 | Mori |
| 7,241,192 | B2 * | 7/2007 | Andersen et al. ............... 440/1 |
| 7,287,443 | B2 | 10/2007 | Kuhstrebe et al. |
| 7,296,648 | B2 | 11/2007 | Tatara et al. |
| 7,318,396 | B1 | 1/2008 | Belter et al. |
| 7,473,148 | B2 | 1/2009 | Ichikawa et al. |
| 7,473,149 | B2 | 1/2009 | Mizokawa |
| 7,482,767 | B2 | 1/2009 | Tether |
| 7,518,344 | B2 | 4/2009 | Sihler |
| 7,530,864 | B2 | 5/2009 | Kaji |
| 7,556,547 | B2 | 7/2009 | Kaji |
| 7,565,939 | B2 | 7/2009 | Ando et al. |
| 7,621,789 | B2 | 11/2009 | Mizokawa |
| 7,769,504 | B2 * | 8/2010 | Kaji ............................... 701/21 |
| 7,808,211 | B2 * | 10/2010 | Pacholok et al. ............ 320/140 |
| 7,862,393 | B2 | 1/2011 | Levander et al. |
| 8,039,976 | B2 | 10/2011 | Sato et al. |
| 8,062,081 | B2 | 11/2011 | Barrett et al. |
| 8,290,682 | B2 | 10/2012 | Ewert et al. |
| 8,436,583 | B2 | 5/2013 | Guang et al. |
| 8,453,772 | B2 | 6/2013 | Brown |
| 2002/0005178 | A1 | 1/2002 | Iwatani et al. |
| 2004/0163861 | A1 | 8/2004 | Fukuda et al. |
| 2005/0106953 | A1 | 5/2005 | Andersen et al. |
| 2006/0025025 | A1 | 2/2006 | Kitani et al. |
| 2006/0040791 | A1 | 2/2006 | Nakajima et al. |
| 2006/0096555 | A1 | 5/2006 | Buck |
| 2006/0166573 | A1 * | 7/2006 | Vetta et al. ..................... 440/75 |
| 2007/0062744 | A1 | 3/2007 | Weidenheimer et al. |
| 2008/0041327 | A1 | 2/2008 | Lewis et al. |
| 2008/0120516 | A1 | 5/2008 | Thor |
| 2008/0195287 | A1 | 8/2008 | Janssen et al. |
| 2009/0156068 | A1 | 6/2009 | Barrett et al. |
| 2009/0176417 | A1 * | 7/2009 | Rembach et al. ............... 440/6 |
| 2009/0284228 | A1 * | 11/2009 | Kumar ......................... 320/137 |
| 2009/0288896 | A1 | 11/2009 | Ichikawa |
| 2009/0302616 | A1 | 12/2009 | Peterson |
| 2010/0075798 | A1 | 3/2010 | Suzuki et al. |
| 2010/0105259 | A1 | 4/2010 | Wejrzanowski et al. |
| 2010/0123436 | A1 | 5/2010 | Herrod et al. |
| 2010/0125383 | A1 | 5/2010 | Caouette |
| 2010/0144219 | A1 | 6/2010 | Balogh et al. |
| 2010/0250041 | A1 | 9/2010 | Li |
| 2011/0021313 | A1 | 1/2011 | Steinborn et al. |
| 2011/0195618 | A1 | 8/2011 | Arbuckle et al. |
| 2011/0237141 | A1 | 9/2011 | Tamba |
| 2013/0274969 | A1 | 10/2013 | Wang et al. |

OTHER PUBLICATIONS

Web Page for PowerCharge Battery Charger HV Series—Specifications; http://www.powerdesignersusa.com/powercharge_hv_specs.htm, last visited Jan. 27, 2011 (two pages).

* cited by examiner

METHODS AND SYSTEMS FOR CHARGING A RECHARGEABLE BATTERY DEVICE ON A MARINE VESSEL

FIELD

The present disclosure relates to marine vessels and, more particularly, to systems and methods for charging rechargeable battery devices on marine vessels.

BACKGROUND

A typical marine vessel has one or more internal combustion engines that drive a propulsor, such as for example a propeller, impeller, pod drive, and/or the like. The one or more internal combustion engines provide thrust necessary to propel the vessel. Some marine vessels also include one or more electric motors, which are typically battery-powered motors utilized for trolling.

Abandoned U.S. patent application Ser. No. 11/505,075, hereby expressly incorporated herein by reference, discloses marine propulsion systems that connect both an internal combustion engine and an electric motor to a propulsor in torque-transmitting relation so that the propulsor can selectively receive torque provided by the engine, torque provided by the electric motor, and a sum of torque provided by the engine and the electric motor.

U.S. patent application Ser. No. 12/849,549, filed Aug. 3, 2010, hereby expressly incorporated herein by reference, discloses systems and methods for controlling battery performance in hybrid marine propulsion systems.

SUMMARY

The present disclosure provides systems and methods for charging a rechargeable battery device on a marine vessel having a battery-powered propulsion system such as, for example a hybrid propulsion system, and/or the like.

In one example, a method of charging a rechargeable battery device on a marine vessel comprises: inputting to a control circuit an amount of current that is available from a shore power source; sensing an amount of current that is being drawn from the shore power source by devices on the marine vessel other than a voltage charger for charging a rechargeable battery device; calculating with the control circuit an amount of current that is available to charge the battery device based upon the amount of current that is available from the shore power source and the amount of current that is being drawn from the shore power source by devices on the marine vessel other than the voltage charger; and limiting with the control circuit the amount of current being drawn by the voltage charger to charge the battery device to an amount that is equal to or less than the calculated amount of current that is available to charge the battery device.

Optionally the method can include repeatedly calculating the amount of current that is available to charge the battery device and limiting the amount of current being drawn by the voltage charger to charge the battery device to an amount that is equal to or less than the calculated amount of current that is available to charge the battery device to thereby actively adjust an amount of charge applied to the battery device.

In another example, a method of charging a rechargeable battery device on a marine vessel comprises: operating a control circuit to increase the amount of charge applied to the battery device when an amount of current being drawn from a shore power source decreases and decreasing the amount of charge applied to the battery device when the amount of current being drawn from a shore power source increases.

Optionally the amount of charge applied to the battery device inversely corresponds to the amount that is being drawn from the shore power source by devices on the marine vessel other than a voltage charger.

In another example a system for charging a rechargeable battery device on a marine vessel comprises: a rechargeable battery device; a charger charging the battery device; and a control circuit. The control circuit calculates an amount of current that is available to charge the battery device based upon an amount of current that is available from the shore power source and an amount of current that is being drawn from the shore power source by devices on the marine vessel other than a voltage charger to charge the battery device and limits the amount of current being drawn by the voltage charger to an amount that is equal to or less than the calculated amount of current that is available to charge the battery device.

Optionally the control circuit repeatedly calculates the amount of current that is available to charge the battery device and limits the amount of current being drawn by a voltage charger to charge the battery device to an amount that is equal to or less than the calculated amount of current that is available to charge the battery device to thereby actively adjust an amount of charge applied to the battery device.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
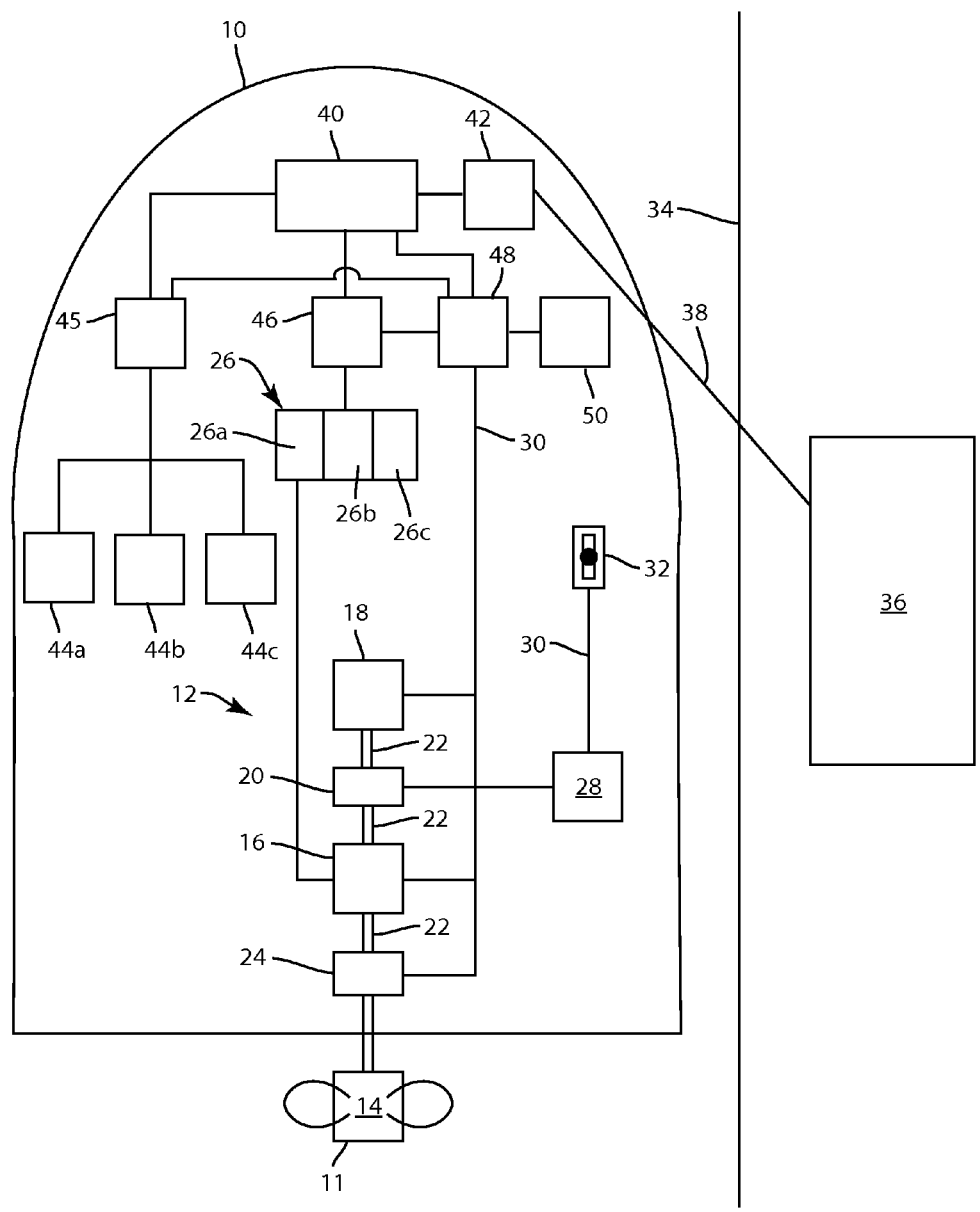
FIG. 1 depicts a marine vessel and a shore power source.

FIG. 1 depicts a marine vessel 10 having a hybrid marine propulsion system 12. The propulsion system 12 includes among other things one or more propulsors 14 (collectively referred to herein as "propulsor"), which can include any type of device for propelling the marine vessel 10 including but not limited to one or more propellers (as shown in FIG. 1), impellers, stern drives, pod drives, and/or the like. The propulsor 14 is selectively driven by one or more electric motors 16 (collectively referred to herein as "motor"), one or more internal combustion engines 18 (collectively referred to herein as "engine"), and a combination of the motor 16 and engine 18. In the example shown, the system 12 also includes one or more clutches 20 (collectively referred to herein as "clutch") for selectively connecting and disconnecting the engine 18 from a driveshaft 22 that extends from the engine 18 to a transmission 24 for driving the propulsor 14. The engine 18 can include a diesel engine or any other type of engine for providing power to the propulsor 14. The clutch 20 can include any type of clutch for connecting and disconnecting the engine 18 and driveshaft 22, such as for example a friction clutch, or a dog clutch because the speeds of the motor 16 and engine 18 can be optionally synchronized (i.e. substantially matched) before the clutch 20 is engaged or disengaged.

The motor 16 is located between the clutch 20 and transmission 24 and is configured to drive driveshaft 22 at the same time or separately from the engine 18. In the examples shown, driveshaft 22 extends through and forms part of the motor 16; however, arrangements where the motor 16 and driveshaft 22 are separate components are also contemplated and should be considered part of this disclosure. Together, the engine 18, clutch 20, motor 16, driveshaft 22 and transmission 24 work together to provide forward, neutral and reverse operations of propulsor 14 in a "parallel" drive arrangement; however, it should be recognized that the examples shown and described are not limiting and that the concepts disclosed and claimed herein are applicable to other types of parallel and non-parallel marine propulsion configurations. Further, as will be discussed herein below, the concepts claimed in the present disclosure are not limited to marine vessels having hybrid marine propulsion systems, but instead are applicable to different types of marine vessels having different types of propulsion systems, such as engine driven systems and/or the like.

FIG. 1 depicts an inboard/outboard marine arrangement; however the concepts disclosed in this disclosure are applicable to any type of marine propulsion system, such as for example an outboard motor arrangement, stern drive arrangement, and/or the like. The propulsor 14 can include one or more propellers, impellers, pod drives, and/or the like. The number in location of marine propulsion systems and related devices can vary from what is shown and described. The marine vessel 10 can embody, for example, a personal watercraft, jet boat, speed boat, fishing boat, luxury watercraft and/or the like.

The system 12 includes a rechargeable battery device 26 which in the example shown includes a plurality of rechargeable batteries 26a, 26b, 26c, which are connected in electrical communication with the motor 16 and discharge current to power the motor 16. In FIG. 1, these batteries 26a, 26b, 26c are shown connected in series with each other and to a motor 16; however, as will be described further herein below, the number of battery devices 26 and the intended operation and/or configuration thereof can vary from that shown and described.

In one example, the motor 16 is operable as a generator to recharge the battery device 26. In certain modes, the motor 16 is connectable in torque-transmitting relation with, and driven by, the engine 18, which in turn provides a supply of current for recharging batteries 26a, 26b, 26c. This type of arrangement is disclosed in the incorporated U.S. patent application Ser. No. 12/849,549.

The system 12 also includes a command controller 28 connected to a controller area network 30 (CAN) for operating the system 12 in a plurality of operational modes. Similar to the embodiment disclosed in the incorporated U.S. patent application Ser. No. 12/849,549, the command controller 28 is shown schematically and can include a plurality of controller sections (not shown), each section having a memory and processor for sending and receiving electronic control signals, for communicating with other controller sections in the CAN 30, and for controlling operations of certain components in the system 12, such as the engine 28, clutch 20, and motor 16. The programming and operations of the command controller 28 and related sections are described in further detail in the above noted pending U.S. patent application Ser. No. 12/849,549 with respect to non-limiting examples and/or algorithms.

The configuration of the command controller 28 and CAN 30 and related sections can vary significantly. The command controller 28 does not need to include separately located sections and can instead comprise a single control device located at one location. Conversely, the command controller 28 can include more sections than those shown and sections located at different locations than those shown.

In the example shown and described, the command controller 28 is configured to receive user inputs via the CAN 30 from a user input device 32. The user input device 32 is shown schematically in FIG. 1 as a conventional combination throttle/shift lever; however, the user input device 32 is not limited to this configuration and can additionally or alternately include other devices for inputting commands to the system 12, such as mode selection buttons, input keys, joy sticks, touch screens, and/or the like. Actuation of the user input device 32 is sensed by sensors (not shown) and communicated to the command controller 28 via the CAN 30. In one example, the input device 32 is located at the helm of the marine vessel 10, although it could be located elsewhere on the marine vessel 10 or remote from the marine vessel 10.

The command controller 28 is programmed to convert the user inputs or "requests" entered at the user input device 32 into electronic commands and then send these commands to other controller sections in the system 12 for control of the various components thereof, including for example the motor 16, engine 18, clutch 20 and transmission 24. Again, the CAN 30 shown in FIG. 1 is exemplary and could be significantly changed and still fall within the scope of the present disclosure and achieve the functional activities set forth herein.

In FIG. 1, the marine vessel 10 is located adjacent shore 34 and, more particularly, adjacent a shore power source 36 for providing power to the marine vessel 10. The particular type of shore power source can vary. In the example shown, the shore power source 36 is a standard utility power source that provides power from a utility to the marine vessel 10 via a wired connection 38. The wired connection 38 supports transfer of electricity to a vessel power distribution circuit 40 via, for example, a plug connection 42. The vessel power distribution circuit 40 distributes current from the shore power source 36 to various auxiliary devices 44a, 44b, 44c on the marine vessel 10 and to a voltage charger 46 configured to charge the battery device 26. The type and configuration of auxiliary devices 44a, 44b, 44c can vary, but typically include standard electrically-powered items found on a marine vessel such as a stove, lights, air conditioning, a radio, and the like.

Conventional battery chargers are known to include a manually-operated dial or switch for controlling the amount of current delivered to the battery charger during its connection to a power source. However, these arrangements have been found by the present inventor to be inflexible and inefficient. Often the dial or switch is set to the "worst case" or lowest setting to ensure that enough power remains available for the various auxiliary devices on the vessel when the batteries are being charged. During research and development of systems and methods for charging rechargeable battery devices on a marine vessel, the present inventor has recognized that it would instead be advantageous to actively monitor the amount of current that is available to charge the battery device 26 while the marine vessel 10 is connected to a shore power source 36 and to actively control the charger 46 to maximize its functionality. The inventor further recognized that in order to understand the amount of current available to the charger 46, one must understand how much current is available from the shore power source 36 and further understand the amount of current that is presently being drawn by, for example, the auxiliary devices 44a, 44b, 44c on the marine vessel 10.

Figure 2:
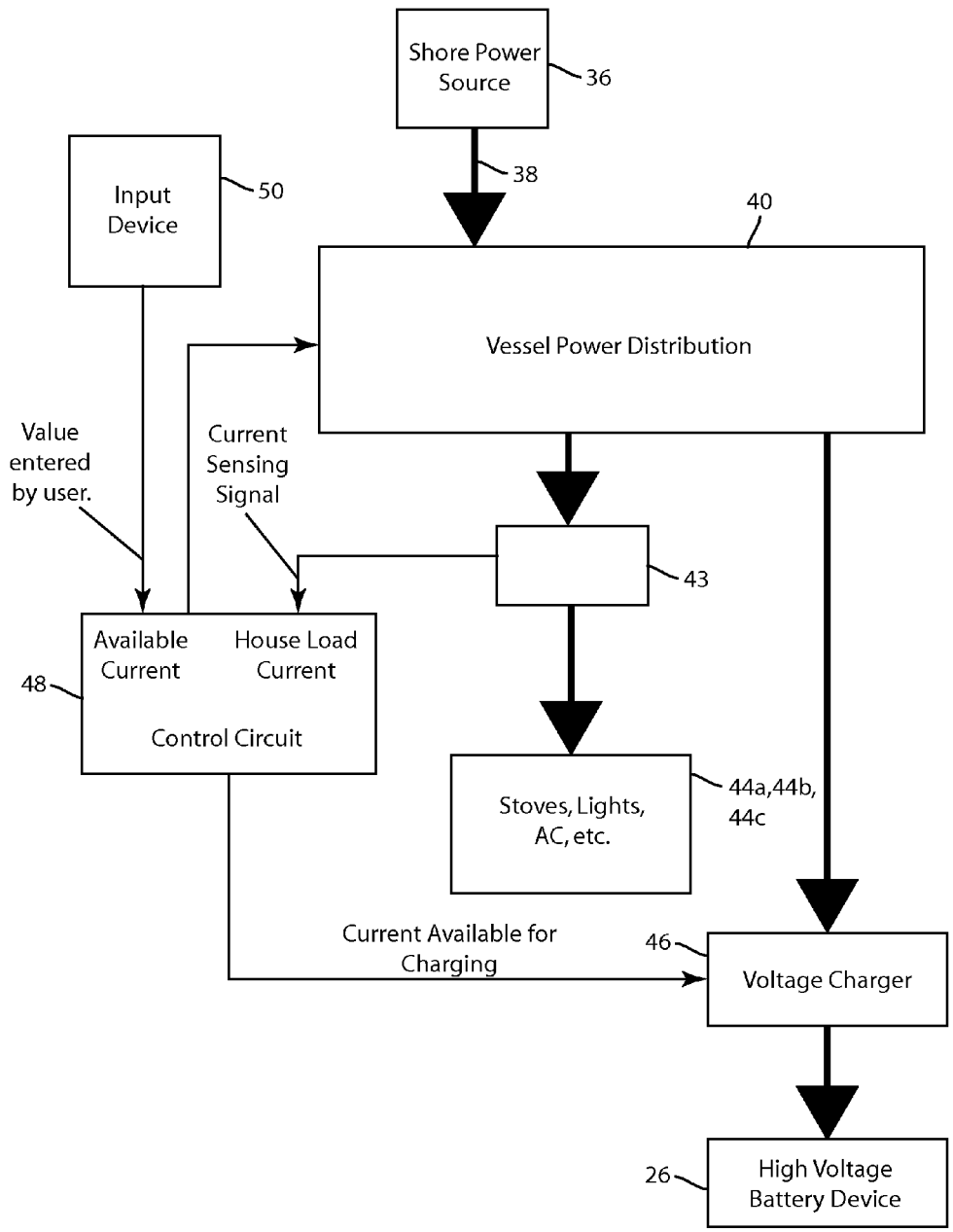
FIG. 2 is a schematic depiction of the marine vessel and shore power source.

Referring to FIGS. 1 and 2, a control circuit 48 is provided on the marine vessel 10. In this example, the control circuit 48 is connected to the CAN 30 and constitutes a control section relative to the aforementioned command controller 28. This is however just one example and in fact the control circuit 48 does not necessarily need to be connected to or form part of the CAN 30 or the command controller 28. In the example shown, the control circuit 48 has computer readable medium and is operable to receive inputs and perform calculations based upon these inputs. Further, the control circuit 48 is operable to output control commands to at least control operation of the charger 46. In this example, the control circuit 48 receives inputs from an input device 50, which in the example shown includes a touch pad and display screen. As with the input device 32, the input device 50 can alternately or additionally include other types of input devices that are known in the art, such as touch screens, joy sticks, levers switches and/or the like. Actuation of user input device 50 is sensed by sensors (not shown) and communicated to the control circuit 48 via an electrical communication link, such as for example the CAN 30 and/or the like.

In this example, the control circuit 48 receives an input from the input device 50 specifying a maximum amount of current that is available from the shore power source 36. This amount will vary depending upon the particular shore power source 36 being utilized by the marine vessel 10 and therefore is typically input by the vessel operator at the time of connection of wired connection 38 between the shore power source 36 and plug connection 42. The control circuit 48 is further operable to receive from a sensor 43 an amount of current that is being drawn from the shore power source 36 by devices on the marine vessel other than the charger 46, such as for example the auxiliary devices 44a, 44b, 44c. FIG. 2 depicts current sensor 43 as a separate element, however current sensor 43 could alternately be combined with or part of the distribution circuit 40 or battery device 26. The control circuit 48 is further configured to calculate an amount of current that is available to charge the battery device 26 based upon the amount of current that is available from the shore power source 36 and the amount of current that is being drawn from the shore power source 36 by the devices on the marine vessel other than the charger 46 as sensed by the current sensor 43. Further, the control circuit 48 is configured to output a command signal to the charger 46 commanding the charger 46 to limit the amount of current being drawn from the shore power source 36 to charge the battery device 26 to an amount that is equal to or less than the calculated amount of current that is available to charge the battery device 26. The charger 46 is configured to receive and act upon the control/command signals from the control circuit 48. In an alternate embodiment, the control functionality can be integrated with the distribution circuit 40 instead of the charger 46.

The control circuit 48 can be configured to repeatedly calculate the amount of current that is available to charge the battery device 26 and limit the amount of current being drawn by the voltage charger 46 to charge the battery device 26 to an amount that is equal to or less than the calculated amount of current that is available to charge the battery device 26 to thereby actively adjust the amount of charge applied to the battery device 26.

Figure 3:
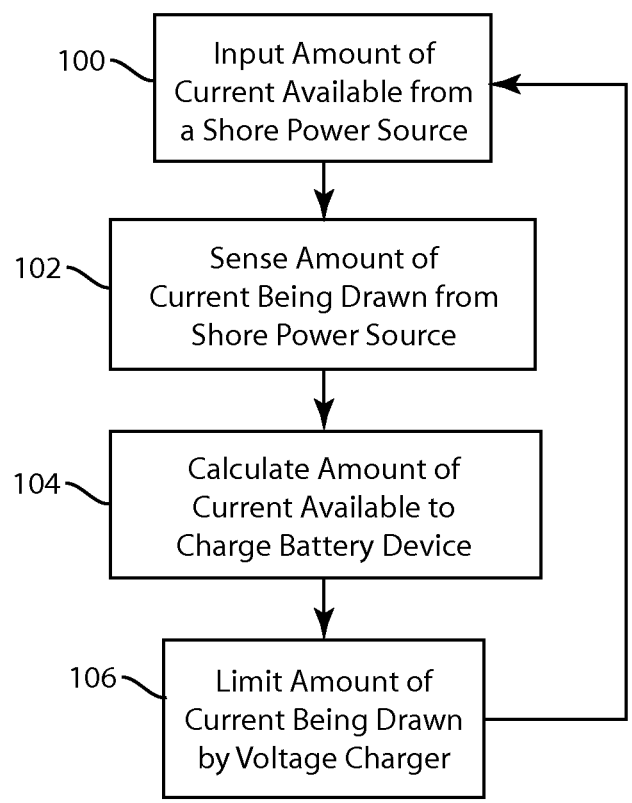
FIG. 3 is a flowchart illustrating one example of a method of charging a rechargeable battery device on a marine vessel.

One non-limiting example of a method of charging a rechargeable battery device on a marine vessel is provided in FIG. 3. At step 100, a user inputs to a control circuit an amount of current that is available from a shore power source. At step 102 an amount of current that is being drawn by the marine vessel from the shore power source is sensed and provided to the control circuit. At step 104 the control circuit calculates an amount of current that is available to charge a rechargeable battery device on the marine vessel based upon the amount of current that is available from the shore power source and the amount of current that is being drawn from the shore power source. Thereafter at step 106, the control circuit sends a control signal to the voltage charger to limit the amount of current being drawn by the voltage charger to charge the battery device to an amount that is equal to or less than the calculated amount of current that is available to charge the battery device. Steps 100 through 106 can be repeated so as to thereby repeatedly calculate the amount of current that is available to charge the battery device and limit the amount of current being drawn by the voltage charger to charge the battery device to an amount that is equal to or less than the calculated amount of current that is available to charge the battery device to thereby actively adjust an amount of charge applied to the battery device.

Figure 4:
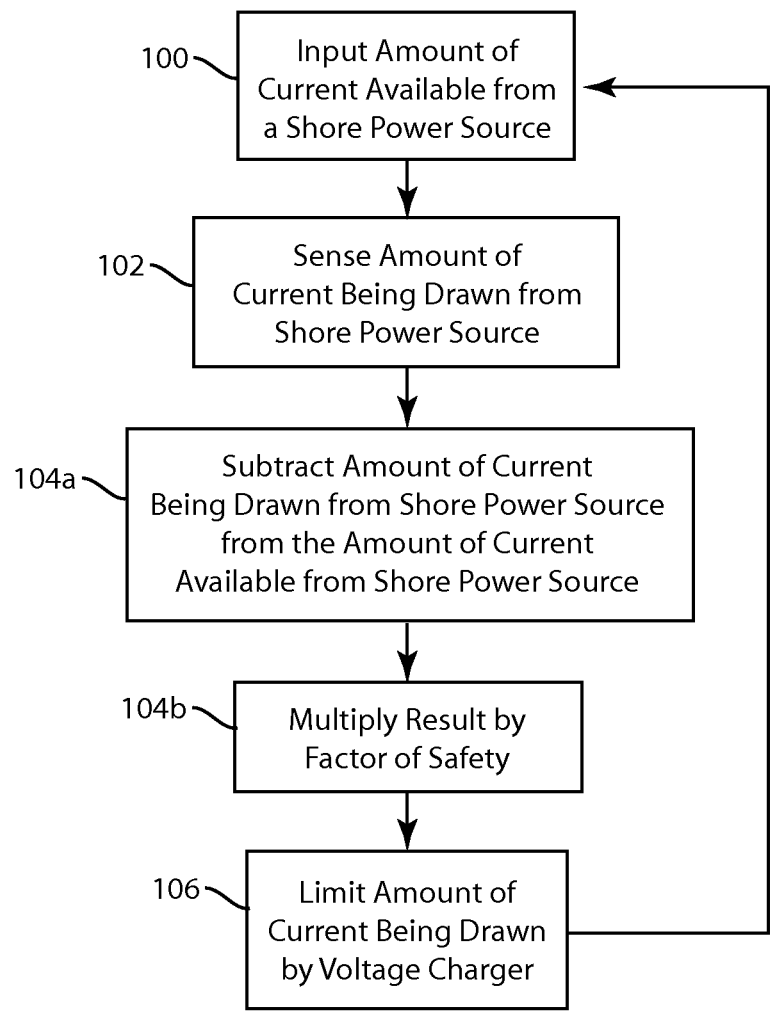
FIG. 4 is a flowchart illustrating another example of a method of charging a rechargeable battery device on a marine vessel.

In the example shown in FIG. 4, at step 104a, the amount of current that is available to charge the battery device is calculated by subtracting the amount of current that is being drawn from the shore power source from the amount of current that is available from the shore power source. In another example, at step 104b, the control circuit can be configured to apply a factor of safety when calculating the amount of current that is available to charge the battery device. In this manner, less than the amount of current that is available from the shore power source can be drawn by the voltage charger, thus allowing a certain amount of power reserve in the system.

It will thus be seen that the present disclosure provides a method of charging a rechargeable battery device on a marine vessel that includes operating a control circuit to increase the amount of charge applied to the battery device when an amount of current being drawn from a shore power source decreases and decreasing the amount of charge applied to the battery device when the amount of current being drawn from a shore power source increases. In these examples, the amount of charge that is applied to the battery device can directly correspond to the amount that is being drawn from the shore power source and the amount of charge applied to the battery device can directly correspond to the amount that is being drawn from the shore power source.

What is claimed is:

1. A method of charging a rechargeable battery device on a marine vessel, the method comprising:

inputting to a control circuit via an input device an input specifying an amount of current that is available from a shore power source;

sensing an amount of current that is being drawn from the shore power source by devices on the marine vessel other than a voltage charger for charging a rechargeable battery device;

calculating with the control circuit a calculated amount of current that is available to charge the battery device based upon the input specifying the amount of current that is available from the shore power source and the amount of current that is being drawn from the shore power source by devices other than the voltage charger; and limiting with the control circuit an amount of current being drawn by the voltage charger to charge the battery device, to an amount that is equal to or less than the calculated amount of current that is available to charge the battery device.

2. The method according to claim 1, comprising repeatedly calculating the calculated amount of current that is available to charge the battery device and limiting the amount of current being drawn by the voltage charger to charge the battery device to the amount that is equal to or less than the calculated amount of current that is available to charge the battery device to thereby actively adjust an amount of charge applied to the battery device.

3. The method according to claim 1, comprising calculating the calculated amount of current that is available to charge the battery device by subtracting the amount of current that is being drawn from the shore power source by devices on the marine vessel other than the voltage charger from the input specifying the amount of current that is available from the shore power source.

4. The method according to claim 3, comprising applying a factor of safety when calculating the calculated amount of current that is available to charge the battery device so that less than the amount of current that is available from the shore power source is drawn by the voltage charger.

5. The method according to claim 1, comprising operating the input device to input the input specifying the amount of current that is available from the shore power source into the control circuit.

6. The method according to claim 1 wherein sensing an amount of current that is being drawn from the shore power device by devices on the marine vessel other than the voltage charger comprises sensing an amount of current that is being drawn by at least one auxiliary device on the marine vessel.

7. The method according to claim 6, wherein the at least one auxiliary device comprises at least one of a stove, a light, and a radio.

8. The method according to claim 6 comprising distributing the amount of current that is being drawn from the shore power source by devices on the marine vessel other than the voltage charger and the calculated amount of current that is available to charge the battery device through a distribution circuit.

9. A system for charging a rechargeable battery device on a marine vessel with a shore power source, the system comprising:
a rechargeable battery device;
a charger charging the battery device;
a control circuit;
an input, device configured to input to the control Circuit an input specifying an amount of current that is available from the shore power source; and
wherein the control circuit is configured to calculate a calculated amount of current that is available to charge the battery device based upon the input specifying the amount of current that is available from the shore power source and an amount of current that is being drawn from the shore power source by devices on the marine vessel other than a voltage charger to thereby charge the battery device and limit an amount of current being drawn by the voltage charger to an amount that is equal to or less than the calculated amount of current that is available to charge the battery device.

10. The system according to claim 9, wherein the control circuit repeatedly calculates the calculated amount of current that is available to charge the battery device and limits the amount of current being drawn by a voltage charger to charge the battery device to the amount that is equal to or less than the calculated amount of current that is available to charge the battery device to thereby actively adjust an amount of charge applied to the battery device.

11. The system according to claim 9, comprising a Control Area Network (CAN), wherein the control circuit comprises at least a part of the CAN.

12. The system according to claim 9, wherein the input device comprises a manual input device.

13. The system according to claim 10, comprising a distribution circuit distributing current from the shore power source to auxiliary devices on the marine vessel and to the voltage charger.

14. The system according to claim 10, wherein the marine vessel comprises auxiliary devices drawing current from the shore power source.

15. The system according to claim 10, wherein the battery device comprises a plurality of rechargeable batteries.

16. The system according to claim 10, comprising an electric motor powered by the battery device.

17. The system according to claim 16, wherein the electric motor comprises part of a propulsion system for the marine vessel.

* * * * *

UNITED STATES PATENT AND TRADEMARK OFFICE
CERTIFICATE OF CORRECTION

PATENT NO. : 9,054,555 B1
APPLICATION NO. : 13/053842
DATED : June 9, 2015
INVENTOR(S) : Aaron J. Ward Page 1 of 1

It is certified that error appears in the above-identified patent and that said Letters Patent is hereby corrected as shown below:

In the claims,

In claim 1, at column 7, line 1, delete the "," between "device" and "to".

In claim 9, at column 8, line 3, delete the "," between "input" and "device".

In claim 9, at column 8, line 3, "Circuit" should instead read --circuit--.

Signed and Sealed this
Second Day of February, 2016

Michelle K. Lee
*Director of the United States Patent and Trademark Office*